United States Patent [19]
Turner

[11] Patent Number: 5,957,244
[45] Date of Patent: Sep. 28, 1999

[54] DISK BRAKE MOUNT

[75] Inventor: Paul H. Turner, Boulder, Colo.

[73] Assignee: Rockshox, Inc., San Jose, Calif.

[21] Appl. No.: 09/048,378

[22] Filed: Mar. 26, 1998

Related U.S. Application Data

[60] Provisional application No. 60/057,466, Sep. 3, 1997.
[51] Int. Cl.$^6$ ....................................... B62L 5/00
[52] U.S. Cl. ............................................ 188/26; 188/24.11
[58] Field of Search ........................ 188/26, 24.11–24.22, 188/72.1, 344, 205 R, 73.46, 18 A, 71.1; 192/217.6, 217.7, 217.3; 280/152.1, 157, 288, 279, 281.1, 284

[56] References Cited

U.S. PATENT DOCUMENTS

| | | |
|---|---|---|
| 3,878,921 | 4/1975 | Kibler et al. ............................. 188/26 |
| 3,949,838 | 4/1976 | Fuhrman ................................... 188/26 |
| 3,989,124 | 11/1976 | Fujii ......................................... 188/26 |
| 4,029,179 | 6/1977 | Butz ......................................... 188/26 |
| 4,061,206 | 12/1977 | Wood ....................................... 188/26 |
| 4,084,663 | 4/1978 | Haley ....................................... 188/26 |
| 4,215,768 | 8/1980 | Seki ......................................... 188/26 |

*Primary Examiner*—Douglas C. Butler
*Attorney, Agent, or Firm*—Skadden, Arps, Slate, Meagher & Flom; David W. Hansen

[57] ABSTRACT

A mounting mechanism for mounting a disk brake to a bicycle. The mounting mechanism includes an elongated mounting bracket that is mounted adjacent the bicycle wheel assembly. Preferably, a first end of the bracket is coupled to the wheel dropout of the frame and a second end of the bracket is coupled to a portion of the bicycle frame, such as the seat stay. A mounting band or other similar coupling element may be used to couple the second end to the frame such that the integrity of the frame is not compromised. The disk brake component to be mounted adjacent the wheel is coupled to the mounting bracket preferably between the ends of the bracket.

18 Claims, 2 Drawing Sheets

DISK BRAKE MOUNT

CROSS-REFERENCE TO RELATED APPLICATION

The present application claims the benefit of the earlier filing date of co-pending U.S. Provisional Patent Application Ser. No. 60/057,466, filed Sep. 3, 1997.

BACKGROUND OF THE INVENTION

The present application relates to a mount for a disk brake. More particularly, the present application relates to a mounting mechanism, preferably in the form of a mounting bracket, for mounting a disk brake adjacent to the front or rear wheel of a bicycle.

Disk brakes, which have been applied to a variety of wheeled vehicles such as cars and motorcycles, have become popular for use with bicycles. Such disk brakes typically include a brake disk mounted on the bicycle wheel and a brake mechanism including a caliper for frictionally engaging the brake disk. The caliper of the disk brake may be actuated using an actuator comprising a hydraulic, pneumatic, cable or linkage mechanism, or other suitable mechanisms, or by a combination of such mechanisms. The actuator preferably is positioned adjacent to or is coupled to the handlebar portion of the bicycle for convenient access during riding. The disk brake further includes an actuation mechanism that is cooperatively engaged with the disk brake actuator, and which may be mounted adjacent the caliper and brake disk for moving the caliper to engage the brake disk as desired.

Typically, the brake disk is mounted about the axle of a bicycle wheel and fixed to the wheel for rotation therewith. In the past, bicycle frames have included a mounting element to which the actuation mechanism and caliper of a disk brake assembly is mounted so that when the caliper frictionally engages the brake disk, the speed of rotation of the brake disk and wheel will be decreased. However, not all bicycle frames are equipped with such mounting elements. Thus, in order to retrofit a disk brake on a bicycle that has another type of brake system and no integral disk brake mounting elements, a retrofit mounting mechanism for the disk brake must be provided.

Disk brake mountings have been incorporated into some disk brake systems such that the systems may be mounted on frames not provided with such a mounting element. Several such disk brake and mounting assemblies are described in U.S. Pat. Nos. 3,949,838 to Buhrman, 5,390,771 to Hinkens, et. al., 5,607,031 to Hollars and 5,632,362 to Leitner, the disclosures of which are incorporated herein by reference in their entireties. Not all brakes are provided with a mounting mechanism, however, and there is therefore a need for a separate mounting bracket that can be attached to a bicycle frame not having disk brake mounting elements.

In addition, disk brake mounting elements of the types described in the aforementioned patents are integrally formed as part of a particular disk brake system and are not usable with other disk brakes. Thus, there is also a need for a disk brake mounting element that may be used with more than one type of disk brake.

Another disadvantage of assemblies such as that shown in the Hollars patent is that such assemblies attach to the axle of a bicycle and therefore do not permit the use of a conventional quick-release wheel connection system. Also, the mounting configurations used in assemblies such as that disclosed in the Fuhrman, Hinkens, Hollars, and Leitner patents are inefficient in that they either do not possess the desired amount of rigidity, or are not as lightweight as is preferable for a disk brake mount, or both. Many of these disk brake and mounting assemblies are also unnecessarily complex. Thus, there is a need for a simple, lightweight yet rigid disk brake mounting element that is adaptable for use in connection with a quick-release wheel mounting system of a bicycle.

Disk brake mounting designs such as that disclosed in the Hollars patent have required modified wheel hubs or other components, the welding of a mounting element to the bicycle frame, or the placement of bolts or other fasteners through the frame. Such mountings are undesirable because, among other things, welding, drilling or other such operations which compromise the integrity of the bicycle frame may reduce the strength and corrosion resistance of the frame. Thus, there is a need for a disk brake mounting element that may be mounted to a bicycle frame without substantially altering the integrity of the bicycle frame or components.

SUMMARY OF THE INVENTION

It is therefore an object of the present invention to provide a mounting mechanism that may be retrofitted on a bicycle frame so that a disk brake system may be mounted thereon.

It is another object of the present invention to provide a mounting mechanism for the mounting of a disk brake system on a bicycle that does not have any disk brake mounting elements.

It is a further object of the present invention to provide a mounting mechanism that may be mounted to a bicycle frame without substantially altering the integrity of the frame.

It is yet another object of the present invention to provide a mounting mechanism that may be used with more than one type of disk brake.

It is another object of the present invention to provide a mounting mechanism that is adaptable for use in connection with a quick-release wheel mounting system of a bicycle.

The above and other advantages are realized in accordance with the principles of the present invention by providing a lightweight, highly rigid mounting mechanism that may be coupled readily and easily to a bicycle frame adjacent a front or rear bicycle wheel. Preferably, the mounting mechanism of the present invention is in the form of a mounting bracket coupled at one end to the wheel dropout of the frame and at another end to another part of the frame without substantially altering the integrity of the frame. A disk brake mechanism, particularly the actuation mechanism, may be readily and easily coupled to the mounting bracket of the present invention adjacent the wheel and brake disk mounted on the wheel. Preferably, the mounting bracket is designed to accommodate more than one type of disk brake mechanism.

These and other objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Figure 1:
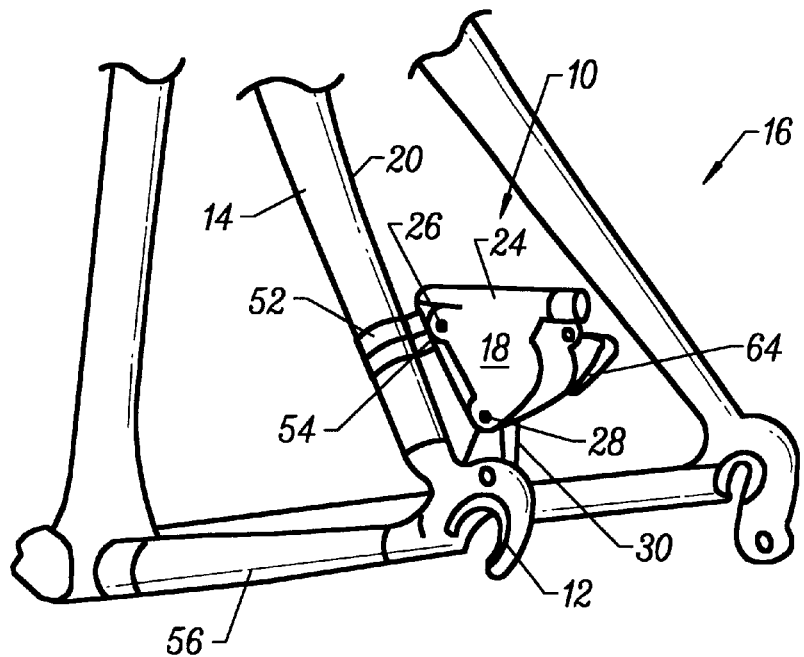
FIG. 1 is a perspective view of the exterior side of a rear portion of a bicycle to which a disk brake actuation mechanism has been mounted with a rear mounting mechanism formed in accordance with the principles of the present invention.
Figure 2:
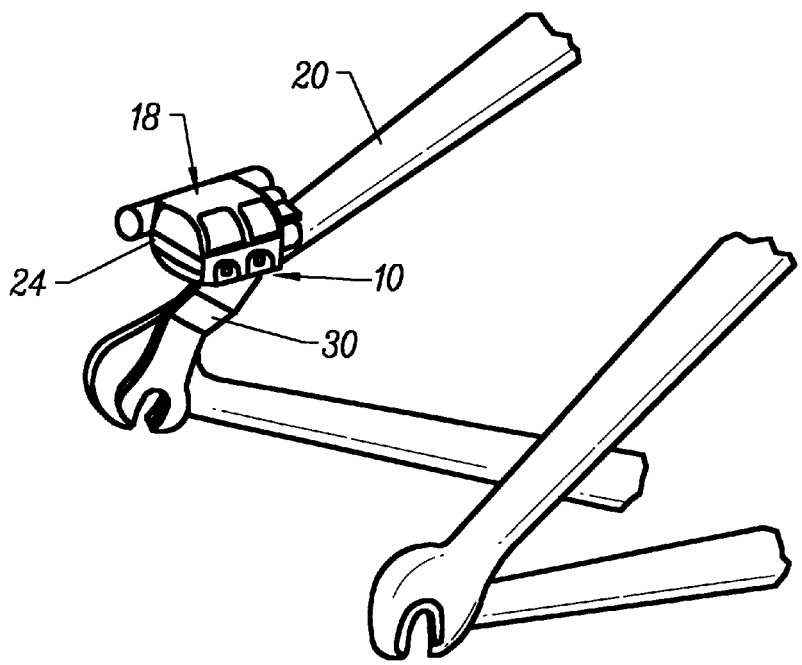
FIG. 2 is a perspective view of the interior side of the rear portion of the bicycle, disk brake actuation mechanism, and mounting mechanism shown in FIG. 1.

As may be observed from the preferred embodiment illustrated in FIGS. 1 and 2, mounting mechanism 10 of the present invention is described herein for mounting a disk brake mechanism to the rear wheel of a bicycle. In particular, mounting mechanism 10 is shown coupled to rear dropout 12 and seat stay 14 of a bicycle frame 16. However, it will be understood that the principles of the present invention may be applied to form a mounting mechanism similarly designed but for mounting a disk brake mechanism to the front wheel of a bicycle.

The present invention provides mounting mechanism 10 for coupling a disk brake system to a preexisting bicycle frame 16 that has not been specifically designed to accommodate such a brake system. In particular, mounting mechanism 10 of the present invention permits retrofitting a disk brake actuation mechanism 18 to a bicycle frame 16, as illustrated in FIGS. 1 and 2. Mounting mechanism 10 of the present invention is mounted on interior side 20 of bicycle frame 16 adjacent wheel dropouts 12 such that disk brake actuation mechanism 18 will be positioned adjacent wheel axle (not shown). Thus, actuation mechanism 18 may actuate the calipers of a brake system to frictionally engage a brake disk mounted about the center of the bicycle wheel for rotation therewith in a manner known in the art.

Typically, actuation mechanisms of disk brake systems designed to be retrofitted to bicycles have mounting mechanisms to facilitate their attachment to a bicycle. In particular, actuation mechanism 18 typically has a housing 24 with one or more mounting elements 26, 28 for matingly engaging a mounting mechanism on a bicycle. Typically, mounting elements 26, 28 on housing 24 of actuation mechanism 18 comprise bores through which pins or rods are passed. The pins or rods are then passed through a corresponding bore on a mounting mechanism on the bicycle.

Figure 4:
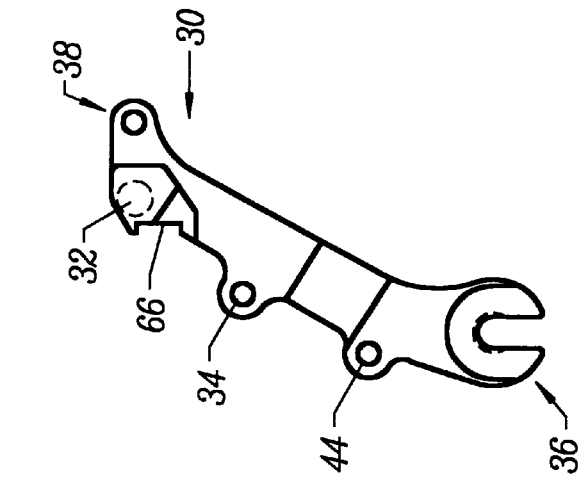
FIG. 4 is a side interior elevational view of the mounting mechanism of FIG. 3.
Figure 5:
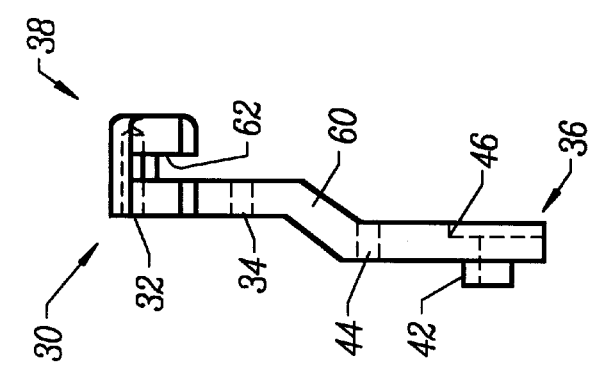
FIG. 5 is a rear end elevational view of the mounting mechanism of FIGS. 3 and 4.
Figure 3:
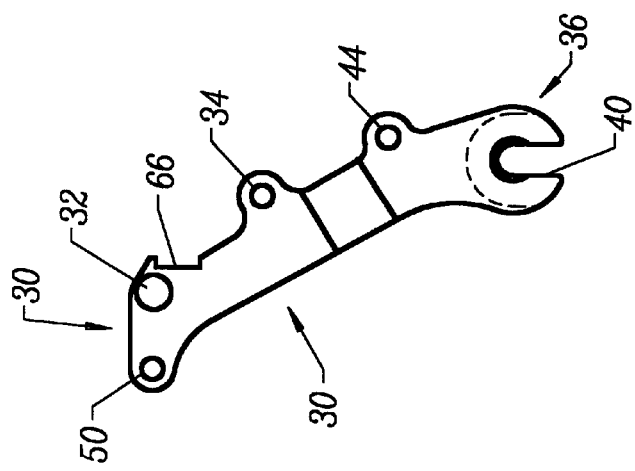
FIG. 3 is a side exterior elevational view of a preferred embodiment of the mounting mechanism of the present invention.

In accordance with the principles of the present invention, mounting mechanism 10 of the present invention is comprised of an elongated mounting bracket 30, as shown in FIGS. 3–5, which may be mounted on a preexisting bicycle frame. Mounting bracket 30 has mounting elements 32, 34 in the form of mounting bores positioned to correspond to mounting bores 26, 28 on housing 24 of the preexisting actuation mechanism 18 of a disk brake system, and preferably to the actuation mechanisms of more than one type of disk brake system. At least one of mounting bores 32, 34 of mounting bracket 30 of the present invention may have a blind bore through which a pin or rod is press fit to couple actuation mechanism 18 thereto, preferably in a slidable fashion. Another bore may be a blind bore, but preferably at least one bore is a through hole to permit a pin affixed to actuation mechanism 18 to slidably pass therethrough. As shown in FIG. 5, upper bore 32 is a blind bore and lower bore 34 is a through hole. However, the reverse may be true.

Mounting bracket 30, shown in isolation in FIGS. 3-5, is preferably formed of a lightweight material such as aluminum, and is provided with first and second mounting ends 36, 38 for mounting to the frame of a bicycle without substantially altering the integrity of the frame. Preferably, first end 36 is mounted to or adjacent to dropout 12 and thus is referred to hereinafter as dropout mounting end 36. Second end 38 is preferably mounted to the frame of the bicycle and thus is referred to hereinafter as the frame mounting end 38. As may appreciated with reference to FIGS. 3–5, mounting elements 32, 34, with which actuation mechanism 18 is mounted to bicycle frame 16, are straddled by ends 36, 38 of mounting bracket 30.

The dropout mounting end 36 of mounting bracket 30 is provided with a quick-release skewer slot 40 through which the wheel axle of the bicycle may be passed. A boss 42 extends laterally outwardly from dropout mounting end 36 of mounting bracket 38, as may be seen in FIG. 5. This boss 42 is preferably shaped and dimensioned to be press fit or, preferably, slidably inserted into the slot of dropout 12 to which mounting bracket 30 is coupled. Thus, mounting bracket boss 42, as well as the mounting bracket configuration, connections and positioning relative to the frame and disk brake, enables the loading produced when the disk brake is in use to be efficiently transferred from the disk brake caliper to bracket 30 and into bicycle frame 16. As a result, although the structure of mounting bracket 30 is minimized, mounting bracket 30 is both rigid and lightweight.

Dropout mounting bore 44, provided at the dropout mounting end 36 as shown in FIGS. 1 and 2, may be used if desired for further securing mounting bracket 30 to dropout 12, and may be threaded for this purpose such that a screw couples bracket 30 to dropout 12. However, this connection is not necessary for using mounting bracket 30, for example, to mount to a bicycle the disk brake described generally in the previously discussed Leitner patent, the preferred disk brake for use with the present invention.

A recess 46, formed on the interior side of dropout mounting end 36 of mounting bracket 30, permits a portion of the wheel assembly of the bicycle that is coupled to dropout 12, such as the wheel hub of a bicycle wheel, to be guided into alignment and locked into placed using a conventional quick release system. Thus, recess 46 is preferably dimensioned and shaped to accept most standard sized wheel hubs, or other such bicycle wheel assembly element.

Frame mounting end 36 of mounting bracket 30 of the present invention is provided with a mounting element 50 by which mounting bracket 30 may be coupled to a frame element of a bicycle. Preferably, mounting element 50 is a through hole, which may be threaded, for alignment with a through hole of a lightweight mounting brace, band, or clip 52 (hereinafter "mounting band"), such as mounting band 52 shown in FIG. 1. Mounting band 52 is coupled to the frame of the bicycle, preferably without substantially compromising the integrity of the frame. For example, mounting band 52 may be mounted around the exterior of the bicycle frame and tightly clipped at one end 54 to provide a fixed, friction fit over the frame, as may be seen in FIG. 1. The through hole of mounting band 52 is preferably provided in clipped end 54 of mounting band 52. A pin, screw or other connection element is passed through the aligned through holes to couple the frame mounting end 38 of mounting bracket 30 to the bicycle frame.

In a preferred embodiment, as shown in FIGS. 1 and 2, frame mounting end 38 is mounted to the stay of the bicycle. Accordingly, as may be appreciated from FIGS. 3 and 4, the longitudinal extent of mounting bracket 30 from end 36 to end 38 is angled to conform to the longitudinal axis of the stay while permitting secure attachment of ends 36, 38 to seat stay 14 in a manner as described above. However, it will be understood that frame mounting end 38 may alternatively be mounted to chain stay 56 or any other suitable frame element. Moreover, it will be understood that the principles disclosed using the preferred embodiment of the present invention, as illustrated in FIGS. 1–5, may be applied to a mounting bracket used for mounting a disk brake mechanism to the front wheel of a bicycle, such that frame mounting end 38 of mounting bracket 30 is mounted to the front fork.

As known in the art, seat stays 14 and chain stays 56 of a bicycle 16 typically are furthest apart at the wheel axle and converge as they approach the seat and crank of the bicycle, respectively. As may be seen in FIG. 5, a bend 60 therefore is preferably provided along mounting bracket 30. This bend 60 permits the disk brake caliper to be aligned with the brake disk. An exemplary angle at which bend 60 is formed is approximately 30°. As may be appreciated with reference to FIG. 5, the provision of bend 60 causes ends 36, 38 of mounting bracket 30 to be out of vertical alignment when viewed from the front or rear end (corresponding, respectively, to the front and rear ends of the bicycle).

As may be seen in FIG. 5, a slot 62 is provided adjacent frame mounting end 38 of mounting bracket 30. This slot 62 is preferably aligned with a similar slot 64 in actuation mechanism housing 24. Both of these slots are formed to provide clearance for the brake disk. Additionally, a substantially rectangular cutout 66 is preferably formed at frame mounting end 38 of mounting bracket 30, as may be seen in FIGS. 3 and 4. Cutout 66 defines a guide track for the end of the brake shoes of the disk brake system.

Thus, in accordance with the principles of the present invention, a disk brake system may be mounted to a preexisting bicycle not originally manufactured to accommodate a disk brake system. The mounting mechanism of the present invention is configured such that the structural integrity of the bicycle and the disk brake system need not be compromised.

It will be noted that the dimensions disclosed herein are selected for a preferred embodiment of a rear disk brake mount for a conventional bicycle. However, one skilled in the art will appreciate that these dimensions may be modified to apply the mounting bracket of the present invention to the front fork of a bicycle, or to correspond to the rear of front portion of another type of bicycle with which the mounting bracket is to be used.

While the foregoing description and drawings represent the preferred embodiments of the present invention, it will be understood that various additions, modifications and substitutions may be made therein without departing from the spirit and scope of the present invention as defined in the accompanying exemplary claim. In particular, it will be clear to those skilled in the art that the present invention may be embodied in other specific forms, structures, arrangements, proportions, and with other elements, materials, and components, without departing from the spirit or essential characteristics thereof. One skilled in the art will further appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

What is claimed is:

1. A disk brake mounting mechanism for mounting a disk brake system to a bicycle, said mounting mechanism comprising an elongated mounting bracket having a first end and a second end, said first end shaped for mounting to a wheel dropout and said second end shaped for mounting to a frame element of the bicycle, said mounting bracket further including a body extending between said first end and said second end having spaced-apart inner and outer edges, said mounting bracket being bent to partially encircle an area with said inner edge facing the area, wherein two mounting bores are defined in said mounting bracket adjacent to said outer edge, said mounting bores extending respectively along two separate, generally parallel axes, said mounting bores by which of a component of a disk brake system is coupled to said bracket, and wherein a skewer slot shaped to accommodate the skewer of a bicycle wheel is formed to extend into said first end, said skewer slot being spaced from said outer edge.

2. A mounting mechanism as in claim 1, wherein said first and second ends of said mounting bracket are shaped such that said mounting bracket is mountable to a frame element of a the bicycle without comprising the structural integrity of the frame element.

3. A mounting mechanism as in claim 2, further comprising a mounting band coupling said second end of said mounting bracket to the frame element of the bicycle.

4. A mounting mechanism as in claim 1, wherein said first end further includes a boss positioned and shaped for insertion into the dropout of the bicycle whereby said first end of said mounting bracket is mounted to the dropout.

5. A mounting mechanism as in claim 4, wherein said boss includes said skewer slot shaped to accommodate the skewer of a bicycle wheel.

6. A mounting mechanism as in claim 5, wherein:
said bracket has an exterior side and an interior side;
said boss is positioned on said exterior side; and
a recess is formed in said interior side of said bracket at said first end and shaped to accommodate a portion of a wheel assembly coupled to the wheel dropout.

7. A mounting bracket as in claim 1, wherein:
said bracket has an exterior side and an interior side; and
a recess is formed in said interior side of said bracket at said first end and shaped to accommodate a portion of a wheel assembly coupled to the wheel dropout.

8. A mounting mechanism as in claim 1, wherein:
said mounting bores of said mounting bracket are positioned to correspond to mounting elements on a component of the actuation mechanism of the disk brake system.

9. A mounting mechanism as in claim 1, wherein a second bend is formed in said mounting bracket such that said first and second ends are out of vertical alignment when mounted on the bicycle.

10. A mounting mechanism as in claim 9, wherein said second bend is shaped to permit alignment of a disk brake caliper mounted on said bracket with a brake disk mounted on the bicycle wheel adjacent said mounting bracket.

11. A mounting mechanism as in claim 9, wherein said second bend is shaped to permit attachment of said first end of said mounting bracket to a dropout and said second end of said mounting bracket to a seat stay.

12. A mounting mechanism as in claim 1, wherein a slot is formed in said second end to provide clearance for a brake disk.

13. A mounting mechanism as in claim 1, wherein a guide track is formed in said second end to provide clearance for brake shoes.

14. A method of mounting a disk brake to a frame element of a bicycle, said method comprising the steps of:

provide an elongated mounting bracket having a first end, a second end, and a body extending therebetween with spaced-apart inner and outer edges, said mounting bracket being bent to partially encircle an area with said inner edge facing the area, wherein two mounting bores are defined adjacent to said outer edge, said mounting bores extending respectively along two separate, generally parallel axes, and wherein a skewer slot shaped to accommodate the skewer of a bicycle wheel is formed to extend into said first end, said skewer slot being spaced from said outer edge;

coupling said first end of said mounting bracket to a wheel dropout, said first end being shaped to engage the wheel dropout;

coupling said second end of said mounting bracket to a frame element of the bicycle, said second end being shaped for mounting to the bicycle frame element; and coupling a component of a disk brake system to said bracket via said mounting bores.

15. A method as in claim 14, wherein said step of coupling said first end of said mounting bracket comprises the step of inserting a boss on said first end into a dropout of the bicycle frame.

16. A method as in claim 15, wherein said step of coupling said second end of said mounting bracket comprises the step of coupling said second end to the bicycle frame element with a mounting band, whereby said steps of coupling said first and second ends of said mounting bracket do not compromise the integrity of the bicycle frame.

17. A method as in claim 14, wherein said step of coupling said second end of said mounting bracket comprises the step of coupling said second end to the bicycle frame element with a mounting band, whereby said step of coupling said second end of said mounting bracket does not compromise the integrity of the bicycle frame.

18. A method as in claim 14, wherein said step of coupling a component of a disk brake system to said bracket comprises the step of coupling a disk brake actuation mechanism between said first and second ends of said mounting bracket.

* * * * *